United States Patent [19]

Bird et al.

[11] Patent Number: 5,631,831

[45] Date of Patent: May 20, 1997

[54] DIAGNOSIS METHOD FOR VEHICLE SYSTEMS

[75] Inventors: John A. Bird, Portabe; Martin P. Franz, Kalamazoo; Harry M. Gilbert, Kalamazoo; Steven F. Johnson, Kalamazoo; Michael R. Shafer, Portage, all of Mich.

[73] Assignee: SPX Corporation, Muskegon, Mich.

[21] Appl. No.: 548,966

[22] Filed: Aug. 8, 1995

Related U.S. Application Data

[63] Continuation of Ser. No. 23,573, Feb. 26, 1993, abandoned.

[51] Int. Cl.$^6$ ........................................ G06F 17/21
[52] U.S. Cl. .............. 364/424.034; 73/116; 73/117.2; 73/117.3; 364/431.04; 364/550; 364/551.01; 395/22; 395/50
[58] Field of Search ............. 364/424.03, 424.01, 364/424.04, 431.04, 550, 551.01, 579; 395/911, 913, 75, 50, 22; 73/116, 117.2, 117.3

[56] References Cited

U.S. PATENT DOCUMENTS

| | | | |
|---|---|---|---|
| 4,128,005 | 12/1978 | Arnston et al. | 73/117.3 |
| 4,302,815 | 11/1981 | Tedeschi et al. | 364/551 |
| 4,373,186 | 2/1983 | Marshall et al. | 364/431.01 |
| 4,809,175 | 2/1989 | Hosaka et al. | 364/424 |
| 4,884,056 | 11/1989 | Ishizeki | 340/453 |
| 4,906,970 | 3/1990 | Momura | 340/459 |
| 4,975,847 | 12/1990 | Abe et al. | 364/424.03 |
| 4,980,845 | 12/1990 | Govekar | 364/550 |
| 5,003,478 | 3/1991 | Kobayashi et al. | 364/424.03 |
| 5,010,487 | 4/1991 | Stonehocker | 364/424.03 |
| 5,041,976 | 8/1991 | Marko et al. | 364/424.03 |
| 5,056,023 | 10/1991 | Abe | 364/424.03 |
| 5,072,391 | 12/1991 | Abe | 364/424.04 |
| 5,079,704 | 1/1992 | Sakai et al. | 364/424 |
| 5,111,686 | 5/1992 | Kamiya et al. | 73/117.3 |
| 5,214,582 | 5/1993 | Gray | 364/424.03 |

OTHER PUBLICATIONS

G. Armano and M. Solimano. "Empirical and Functional Knowledge in an Expert System for Fault Diagnosis", IEEE, 1988, pp. 109–114.

G. Montgomery, "Abductive Diagnostics" AIAA Conf. Oct. 1989.

Montgomery, "Abductive Diagnostics," *AIAA Computers in Aerospace VII Conference and Exhibit*, Oct. 3–5, 1989, Ca.

*Primary Examiner*—Kevin J. Teska
*Assistant Examiner*—Thai Phan
*Attorney, Agent, or Firm*—Kinney & Lange, P.A.

[57] ABSTRACT

A data driven, multi-dimensional diagnostic method that combines vehicle system test data, vehicle attributes, symptoms, and extrinsic data to produce vehicle system diagnostics. Data are combined according to predetermined equations to yield intermediate diagnostic results. Intermediate diagnostic results are combined recursively according to fixed expressions to produce final diagnostic results relating to the state of the vehicle system under diagnosis. Fixed expressions may be algebraic, Boolean, fuzzy logic, statistical, or relate to an expert system.

14 Claims, 6 Drawing Sheets

DIAGNOSIS METHOD FOR VEHICLE SYSTEMS

This is a continuation of application Ser. No. 08/023,573 filed Feb. 26, 1993, now abandoned.

BACKGROUND

1. Field of the Invention

This invention relates generally to the field of automotive vehicle system diagnostics and more particularly to results evaluation leading to automatic diagnostic generation.

2. Description of the Related Art

Automotive vehicle system diagnostics procedures typically evaluate results of tests performed on a vehicle. Tests are either chosen by an engine analyzer system or are chosen manually based on a mechanic's knowledge of trouble symptoms. In the former case, the engine analyzer system instructs the operator to set up the test by attaching various test probes to the engine or system under test and performing certain actions such as maintaining a fixed RPM under load or cranking an engine during start.

The results of such tests, and knowledge about the vehicle or engine type, trouble symptoms, allowable limits, and other data can lead to a diagnosis of a problem. Diagnosis usually points to some corrective action such as parts replacement or system adjustment by the operator.

Marshall et al. in U.S. Pat. No. 4,373,186 teach a matrix method for obtaining diagnostics from engine test results. Tests are run on an engine, and results are entered as true/false dots in a matrix. Each dot or point in the matrix has an associated numeric value represented as a multi-digit binary number. The binary numbers represented by dots are combined by means of Boolean equations to yield a diagnostic which is reported to the operator. The results of tests can only be represented as true/false or pass/fail values (dots), and there is no way to ascertain whether or not a given test was performed.

There is a great need for a method that can integrate vehicle and engine attribute information with symptom data and test results to produce diagnostic results. Because test results are analog quantities, they should be represented by numbers rather than true/false or pass/fail values. It is very important to have the ability to perform intermediate arithmetic or logical analysis on test data, vehicle attributes, limits, and symptoms. The method should allow flexible equations and techniques to map intermediate results into final diagnostics. It is important that functions that perform this mapping be able to be evaluated recursively since it is not always possible to obtain complete diagnostic results in one pass. The generated diagnostic results should point to the causes of a problem, indicate corrective actions to be performed, and suggest additional tests to refine the diagnosis.

SUMMARY

The present invention satisfies the need for a flexible, efficient and comprehensive vehicle diagnosis method. It comprises the steps of: receiving measurement results corresponding to measured values of vehicle operating parameters, vehicle attributes, test limits, and symptoms; combining symptoms, limits, and measurement results in accordance with arithmetic or logical equations to produce numeric or true/false intermediate diagnostic results; and finally combining intermediate diagnostic results, in accordance with expressions to produce final diagnostic results relating to the state of the vehicle and suggesting corrective action.

The method may be part of a software program which runs on a general purpose computer, personal computer such as the IBM personal computer or clones, microprocessor, digital signal processor or microprocessor or any other computer means. The method may also be hard wired as digital logic or constructed from programmable logic devices.

The present invention takes orthogonal or independent input data and combines it in several different ways to obtain diagnostic results. Test input data comprises numbers or values of parameters measured, as well as information about whether an operator was able to successfully run the test in which these parameter values were to have been acquired. Vehicle attribute data comprises vehicle and engine type, year, and other relevant information such as ignition system type. Test limits are numerical values that may be upper, lower, or upper and lower bounds to test results. Symptoms are usually keyed in from a list or menu of possible common vehicle system symptoms. In addition to taking on numerical and logical values, data can take the value of "unknown" or X. An "unknown" input value can arise when a test could not be run, its result was inconclusive, or the data is not available.

Input data are combined by intermediate numerical and logical equations to produce intermediate results. The intermediate results can be numbers or true/false logical values. The intermediate equations or computations must be able to handle values of "unknown" as well as those that are known.

Arithmetic, logical, rule, or other expressions combine intermediate results to produce final diagnostic results that point to a problem and suggest action to take to fix it. The final expressions may be linear or non-linear and can include comparisons against limits, further arithmetic steps, Boolean algebra, and fuzzy logic. They may be computational, Bayesian, probabilistic, statistical, or partially or totally rule driven. They may be derived from expert knowledge of how symptoms and test results from different engines and vehicle systems relate to actual problems or they may be empirical. The expressions may be iterative or recursive in nature. The final diagnostic result, including a recommended repair procedure, may derive from expert knowledge of vehicle and engine maintenance.

The present invention overcomes shortcomings in previous methods of diagnostic results generation for vehicle systems by using multi-dimensional methods to process numerical or logical values as well as symptoms supplied by the operator, vehicle attributes, and extrinsic information to produce final diagnostics that point to the trouble and suggest corrective action. The possibility of recursive and data driven evaluation offers enhanced flexibility and permits successive refinement of diagnostic results.

BRIEF DESCRIPTION OF THE DRAWINGS

For a more complete understanding of this invention, reference should now be made to the embodiments illustrated in greater detail in the accompanying drawings and described below by way of examples of the invention.

It should be understood, of course, that the invention is not necessarily limited to the particular embodiments illustrated herein.

DETAILED DESCRIPTION AND PREFERRED EMBODIMENT

The present invention relates to a method of combining input data comprising test results, symptoms, vehicle attributes, test limits and other data to produce intermediate results. Intermediate results are further processed and combined to produce expert diagnostics that point to vehicle system problems and recommend a repair procedure.

Figure 1:
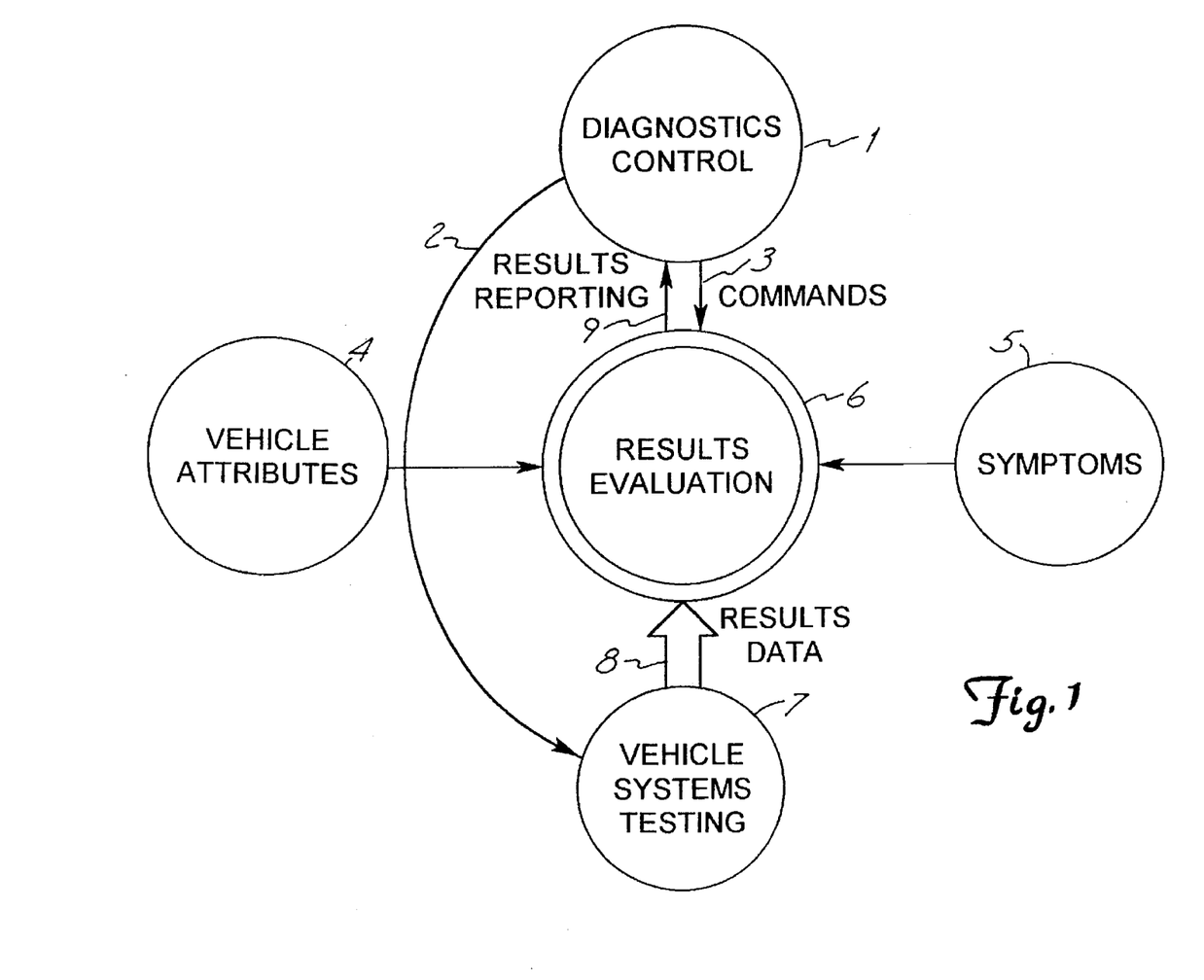
FIG. 1 is an overview of the present invention.

FIG. 1 is an overview of the present invention. Various inputs and commands flow into a results evaluation process 6. These inputs are vehicle attributes 4, symptoms 5, and test results 8 from tests run on the vehicle by a vehicle testing system 7. Diagnostics control 1, originates commands 3 for diagnostics and receives results 9. Commands 2 may be sent to a vehicle testing system 7 to run a prescribed test.

Vehicle attributes 4 and symptoms 5 are found from either a stored data base or from an operator via a keyboard function. Test results data 8 come either directly from a vehicle test or from a data base containing the stored results of tests.

Figure 2:
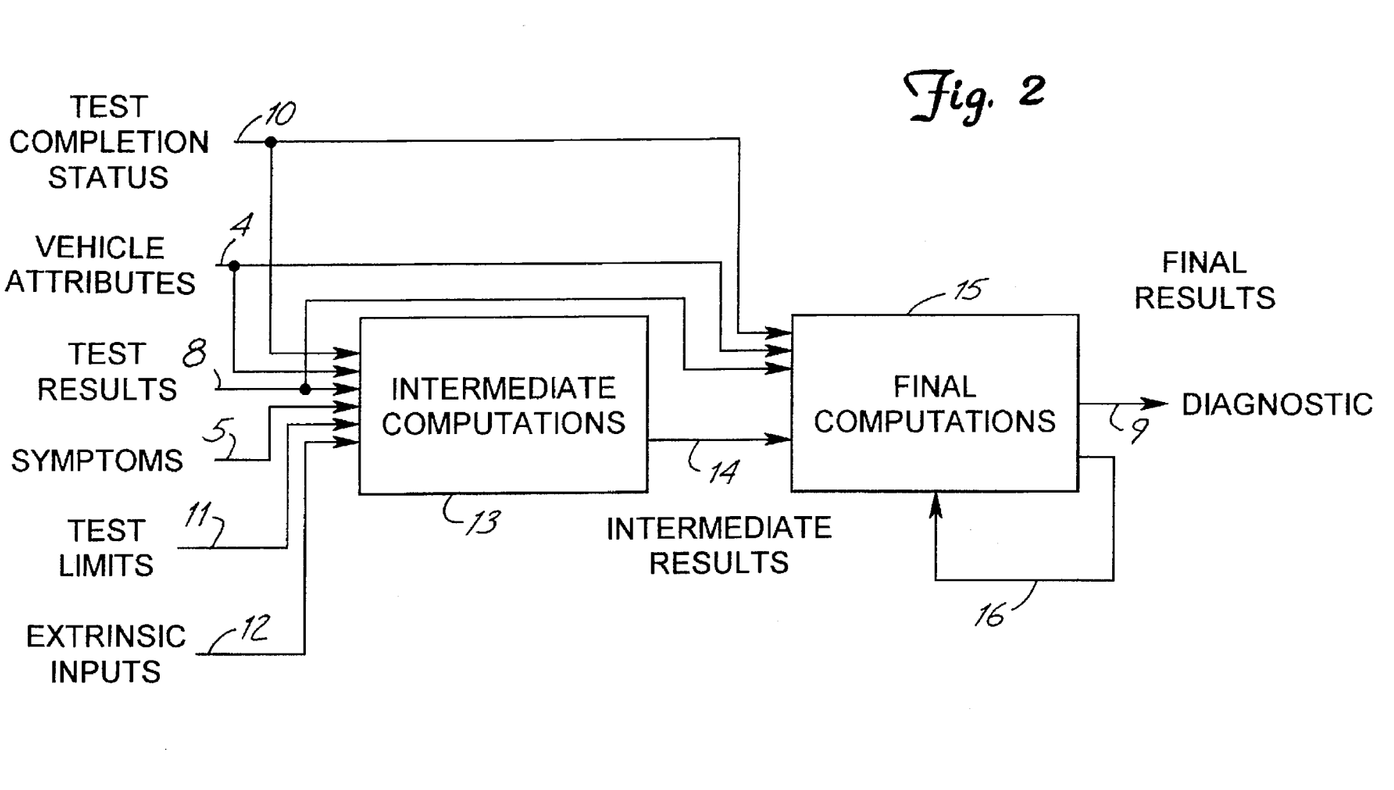
FIG. 2 shows the relationship between input data, intermediate computations, intermediate results, final computations, and final results.

FIG. 2 shows the relationship between input data, intermediate computations, final computations, and final results. Intermediate and final computations are part of the results evaluation module 6 shown in FIG. 1. Intermediate computations and final computations may be accomplished by an intermediate computation means and a final computation means respectively that may be a computer such as any type of personal computer or general purpose computer, a microprocessor, a digital signal processor, or a hard-wired logic circuit.

Input data consist of a test completion status 10 that signals whether a certain commanded test has been performed successfully, vehicle attributes 4 that indicate the type and model of vehicle and engine, test results 8 that are numbers recorded during a test, symptoms 5 that may come from the operator, test limits 11 that relate to the expected results of the test, and extrinsic parameters 12 that may influence the test.

The test completion status 10 may take a logical value of true/false showing completion or no completion, or it may be of a more complex form showing partial completion of the test. Test results 8 can be simply pass/fail, or they can take numerical values. An example of a test might be a battery current cranking test. Here the engine is cranked as if to start it. Battery current and voltage may be monitored. The test completion status is set to true if the test is completed and false if it is not. The test results may be a certain number of amperes drawn from the battery during a specified time window during the test and the battery output voltage during the same window. If, for some reason, it was impossible to complete the test, the test completion status is set to false, and the test results might be set to "unknown." This is simply an example of one possible type of test. Numerous other types of tests may also be run in the context of the present invention to produce diagnostic results.

Vehicle attributes 4 are read from a stored data base, or they may be entered by an operator. They normally consist of the vehicle model, vehicle identification number (VIN), engine type, overall type of vehicle (such as car or truck), and any other vehicle dependent data.

Symptoms 5 can be entered by an operator from a menu of common symptoms or by some other means. They are optional since diagnostics can proceed with or without them. If they are not supplied, they take values of "unknown," and diagnostics are derived strictly from test results. In the battery cranking example, a symptom might be inability to start the engine in cold weather.

Test limits 11 are usually contained in a data base relating to a given vehicle for a given test type. They may be common for tests of a given type across all vehicles, or they may be vehicle specific. If they are vehicle specific, they can only be accessed after vehicle attributes are known. Test limits may be upper bounds, lower bounds or ranges of allowed or excluded values. They are usually numerical but may also be logical. In the cranking current example given above, the test limits could be a maximum allowed cranking current and minimum battery voltage.

Extrinsic parameter inputs 12 relate to data items that could affect the test. For example, in the battery cranking example, an extrinsic parameter might be the temperature of the battery environment. Such a parameter could cause modification of the test limit since a cold battery cannot supply the same power as a warm battery. Extrinsic parameters are optional and may be set to a value of "unknown."

Input data are routed to intermediate computations 13 which combine numeric and logical input data to produce intermediate numeric or logical results 14. Intermediate computations 13 may comprise arithmetic equations, comparisons against limits, Boolean equations, Bayesian decisions, statistical methods, fuzzy logic, or rule driven decisions. Intermediate computations handle numerical, logical, and unknown input values. Intermediate results 14 are routed from intermediate computations 13 to final computations 15. Intermediate computations for the battery cranking example might compare weighted values of battery amps and battery voltage against limits to produce true/false or continuous valued intermediate results.

Final computations 15 reduce intermediate results 14 and possibly test completion status 10, vehicle attributes 4, and test results 8 to produce final diagnostic results 9. Final computations may be Boolean equations, arithmetic, comparisons against limits, Bayesian decisions, statistical methods, fuzzy logic, or rule driven decisions. Final results 9 are returned to the operator as a diagnosis of a vehicle system problem and a suggested repair action. Final computations may be performed recursively. Final results 16 that are not totally resolved can recursively be fed back into final computations 15 more than once. Usually, final computations are not done more than twice; however, it is possible to compute final results as many times as necessary to produce stable results 9. In the battery cranking example, final computations might combine true/false intermediate results with other intermediate results in a Boolean AND equation to produce a diagnostic result. The diagnosis in this example might be a weak battery, and the repair action might be to replace the battery. Another diagnosis in this example might be dirty battery cable contacts, and the repair action would be to clean the cable contacts. The battery cranking example represents only one possible application of the current invention.

The present invention utilizes a logical data storage unit called a dot. This is an arbitrary name; it carries no particular significance in itself except as a convenient way to refer to data storage. A dot contains six fields that can contain data or a logical pointer. A pointer is simply a reference to some other logical entity. The six major fields of a dot are: type, value, status, condition, evaluation function, and expression. The logical fields of a dot are shown in the following table.

| Field | Meaning |
| --- | --- |
| Type | Type of Dot |
| Value | Number |
| Status | Good, Bad, Default, Unknown |
| Condition | Able to Meet Test Condition, Unable |
| Evaluation Function | Reference to Function |
| Evaluation Expression | Actual Function (if present) |

The type field identifies the type of logical dot. The value field can contain a stored number or logical value. Its value can be integer, floating point, true/false, a pointer to an array (matrix) of such quantities, or a pointer to another dot. The status field relates to the quality of the value or the logical quantity represented by the dot. A status of "good" means the number stored or quantity represented is valid. A status of bad means it is not. A status of default means that this dot's value has been pre-loaded with a default number. A status of "unknown" means that the value field should be read to mean the value is unknown.

The condition field is used in dots that hold test results. The condition "able to meet test conditions" means that when a test was run, the system under test made it through a set of predefined conditions for that test. The value field usually contains the test result. The condition "unable to meet test conditions" means that the system under test could not make it through the test according to the predefined conditions. Here, the value field may still contain a test result, but it is suspect. For an example of a test that does not meet conditions consider an alternator test that is to be run at a specified engine RPM. The value stored is to be its output current in amperes. If the engine could not maintain or attain the specified RPM, the condition field of the test results dot would contain a condition "unable to meet test conditions" while the value might contain the current at the highest RPM obtainable. This particular example represents only one of many conditions that might be applied to particular tests. The use of the condition field is not restricted to that of this example.

The evaluation function field is usually a reference to a routine or process that can evaluate the particular function, or it might be the name of a standard function that can be looked up. The evaluation function field gives a dot the ability to process data from other dots to fill its value field.

The evaluation expression field comprises the parameter list for the evaluation function. It can be the actual expression to be evaluated, a reference to such an expression, or a reference to a representation of the evaluation algorithm.

Since a dot is a unit of logical storage or a data block, it follows that there can be several types of dots defined. Some possible dot types are: final result dot, test flag dot, symptom dot, vehicle attribute dot, limit dot, measurement dot, calculation dot, intermediate result dot. These are only examples of dot types; many other types can be defined within the scope of the present invention. Thus, vehicle attributes 4 (FIG. 2), test results 8, test limits 11, intermediate results 14, and final results 9, 16 are carried and communicated by passing pointers to, or names of, the dots that contain them. Intermediate computations 13 and final computations 15 combine data from various dots according to expressions and functions contained in the dots themselves and return results to other dots. Dots are thus data blocks that are coupled to data types to form logical storage units that contain the capability to evaluate and process data through their evaluation functions.

Figure 3:
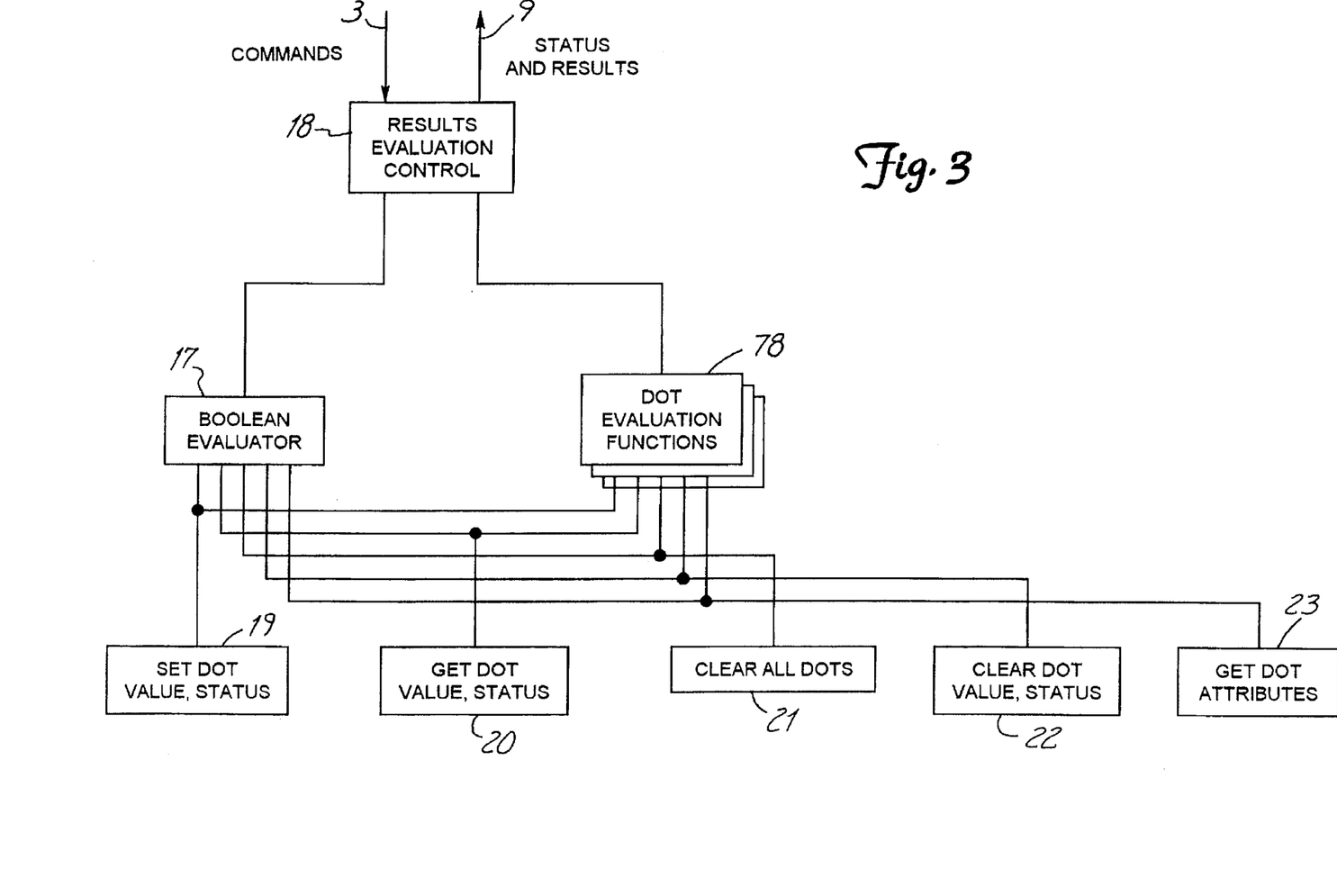
FIG. 3 shows the logical relationship between functional modules.

FIG. 3 shows the relationship between various modules that evaluate data contained in dots. A results evaluation control module 3 receives commands 1 and returns completion status and results 9. The results are contained in results dots. The results evaluation module 18 may require the use of a Boolean evaluator 17 to evaluate Boolean equations or individual dots evaluation functions 78 pointed to by the evaluation function field in a dot. These modules may use lower level dot manipulation modules. These lower level modules actually interact with the dots. Set dot value, status 19 changes the value, status, and condition fields of a dot. Get dot value, status 20 reads the fields of a specific dot. Clear all dots 21 is used for initialization or re-initialization after a series of diagnostics. Clear dot value, status 22 clears a specific dot. Get dot attributes 23 retrieves attributes of a dot including its dot type.

Figure 4:
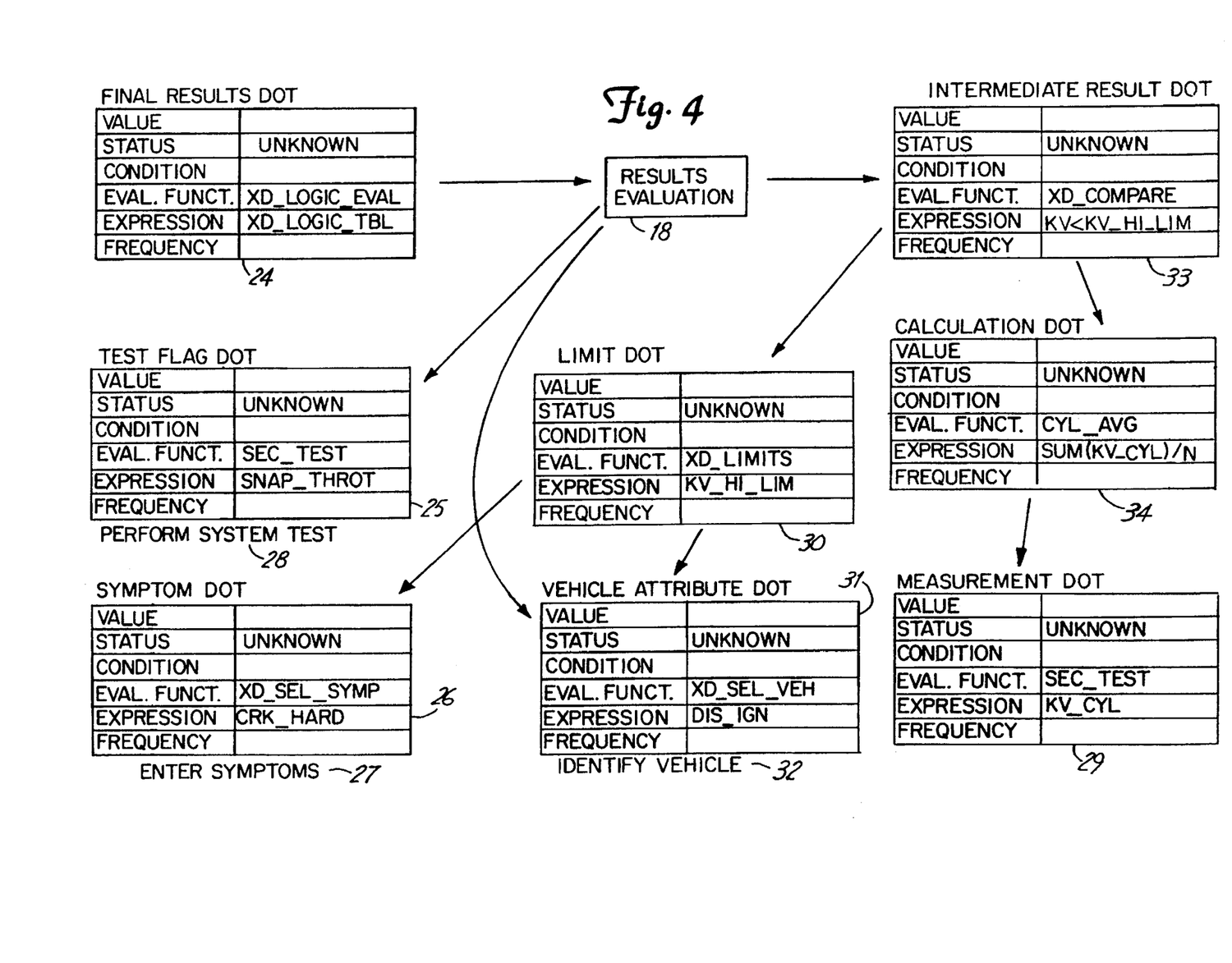
FIG. 4 relates to the data driven nature of results evaluation.

Diagnostic results evaluation is a data driven process. FIG. 4 illustrates the relationships among a set of dots used to generate a particular diagnostic. FIG. 4 represents an example of how dots may be used in one particular test situation. It should be understood that many other types of tests are possible using the method of the present invention, and that other types of tests will result in the use of different types of dots and different logical relationships between dots from that shown in FIG. 4. Nevertheless, the overall functioning of the present invention is the same as it produces final diagnostic results from input data.

The final results dot 24 in FIG. 4 contains a status of "unknown." It is desired to complete this dot and produce a diagnostic for a trouble type labeled XD. In the example represented by FIG. 4, the situation is a vehicle that has trouble starting. Diagnostics control 1 (FIG. I) issues commands 3 (FIG. 1) to evaluate the XD type sequence. The fact that status is "unknown" in the XD final results dot 24 causes results evaluation control 18 to check a test flag dot 25 and a vehicle attribute dot 31. The test flag dot 25 also has a status of "unknown." This will cause the system to command a test 28 that corresponds to the XD sequence. The test in this particular example is a secondary snap throttle test. As the test is run (by an external test manager), the results will be placed in a measurement dot 29 as kilovolt values of secondary ignition voltage during a throttle snap. These numbers will be stored in an array, and a pointer to the array will be placed in the value field of the measurement dot 29, and its status will be set to "good" (or other appropriate value).

Results evaluation 18 will also check an intermediate result dot 33 which in turn activates a calculation dot 34, and a limit dot 30. The calculation dot 34 references the measurement dot 29 that contains the test measurement data, and the limit dot 30 references a vehicle attribute dot 31 and a symptom dot 26. The status of "unknown" in the attribute dot 31, causes a request to identify the vehicle 32. The symptom dot 26 having a status of "unknown" will cause the system to request the operator to enter symptoms 27. This dot's status field will be set to "good" if symptoms are properly entered. When this is done, the attribute dot's status is set to "good", and the limit dot uses its evaluation function field to take the vehicle attributes and symptoms to produce a kilovolt limit for the test which is stored in the value field of the limit dot 30. The limit dot's status is set to "good."

When the measurement is complete, the status field in the measurement dot 29 is set to "good." This causes the calculation dot 34 to evaluate its function of cylinder averaging by summing over the voltages contained in the measurement dot 29 and dividing by N, the number of cylinders. When the function is complete the status of the calculation dot 34 will be set to "good." This causes the intermediate result dot 33 to retrieve the limit from the limit dot 30 and the result of the calculation from the value field of the calculation dot 34, and combine them according to evaluation function of the intermediate result dot 33. Here the function is shown as a simple pass/fail comparison against the limit; however, much more sophisticated intermediate calculations are possible.

The true/false result of the intermediate computation is placed in the value field of the intermediate result dot 33, and its status is set to "good." This causes results evaluation 18 to evaluate a Boolean equation, fuzzy logic, or other expression contained in the expression field of the final results dot 24. The final results dot 24 may use results from other types of tests or sequences, and may now iterate or call more tests based on the current final value. The final results dot 24 will contain a pointer to a diagnostic and corrective action to cure the problem with the vehicle system. Results evaluation 18 will return the status and the results 9 (FIG. 3) to diagnostics control 1 (FIG. 1).

Figure 5:
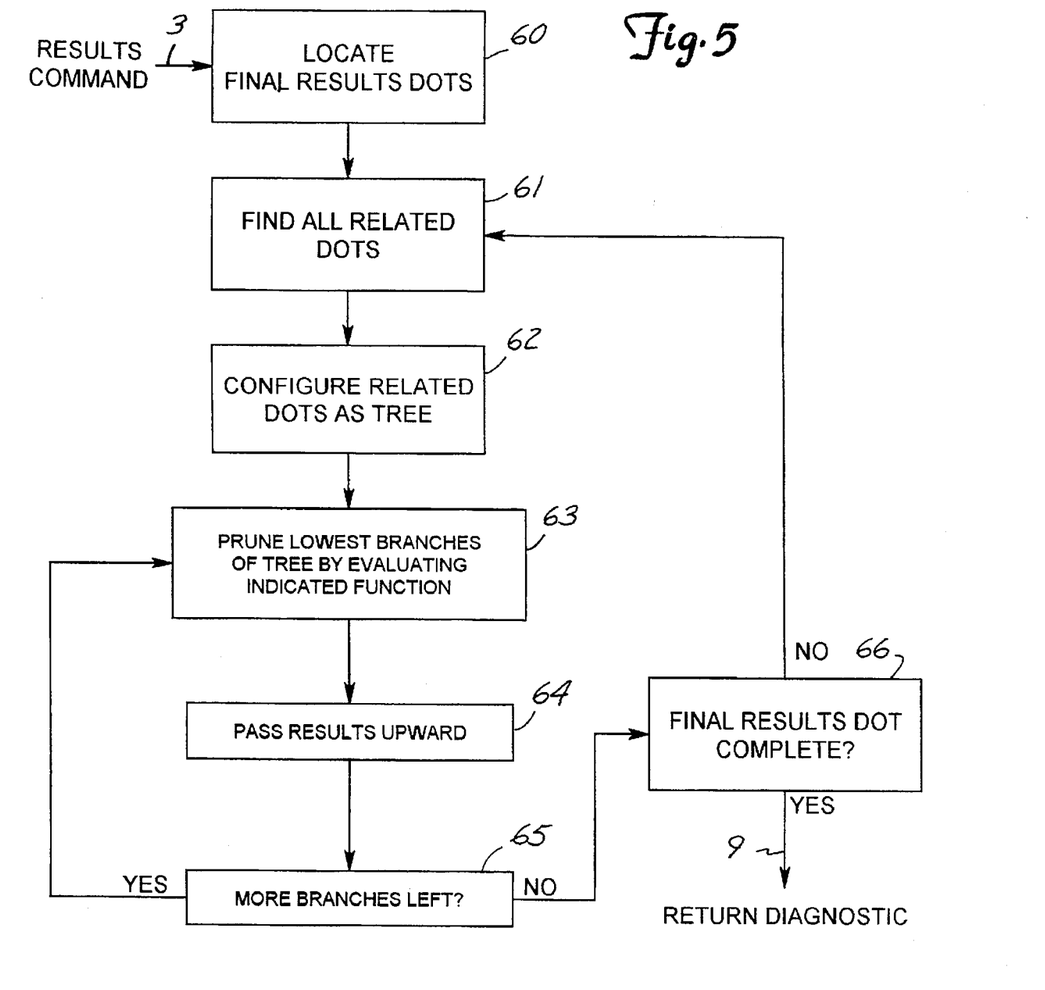
FIG. 5 shows the timing and control flow of the diagnostic generation.

The timing and control sequence of dot evaluation is depicted in FIG. 5. This evaluation is data driven and leads to a final diagnostic result. Diagnostics control 1 (FIG. 1) commands a certain sequence to be commenced. The first step 60 is to locate the final results dot or dots for that type of diagnosis. This dot is initialized to a status of "unknown" and results evaluation proceeds. All dots related to a given final results dot must be found 61 and ordered or configured into a logical tree 62 that represents their natural or logical relations. One such possible tree was previously shown in FIG. 4. The next step is to traverse the lower branches of the tree 63, that is the last or terminal dots in a logical chain, by evaluating their functions as defined in their function evaluation fields. These terminal dots may be test flag dots, symptom dots, vehicle attribute dots, measurement dots, and others. Each of these dots requires some external operation or data access. Some or all of these dots may complete their functions. Completion is signaled by a status other than "unknown" in their status fields. As a dot completes its function, it is pruned from the tree by setting its status. This is a logical step that has the effect of passing the dot value upward in the tree 64. In the preferred embodiment, the value stays with the dot, but the next higher branch in the tree becomes the terminal branch, with access to the lower dot's value. This process continues until the tree is completely pruned (all dots evaluated). An iterative step 65 cycles until the root, or final results dot, is reached. If there is only one final results dot, the process is complete after the final computation is performed. If there is more than one final results dot involved, the tree process must be repeated 66. As previously stated, the final computation can be recursive. The final diagnostic result 9 is returned to diagnostic control.

Figure 6:
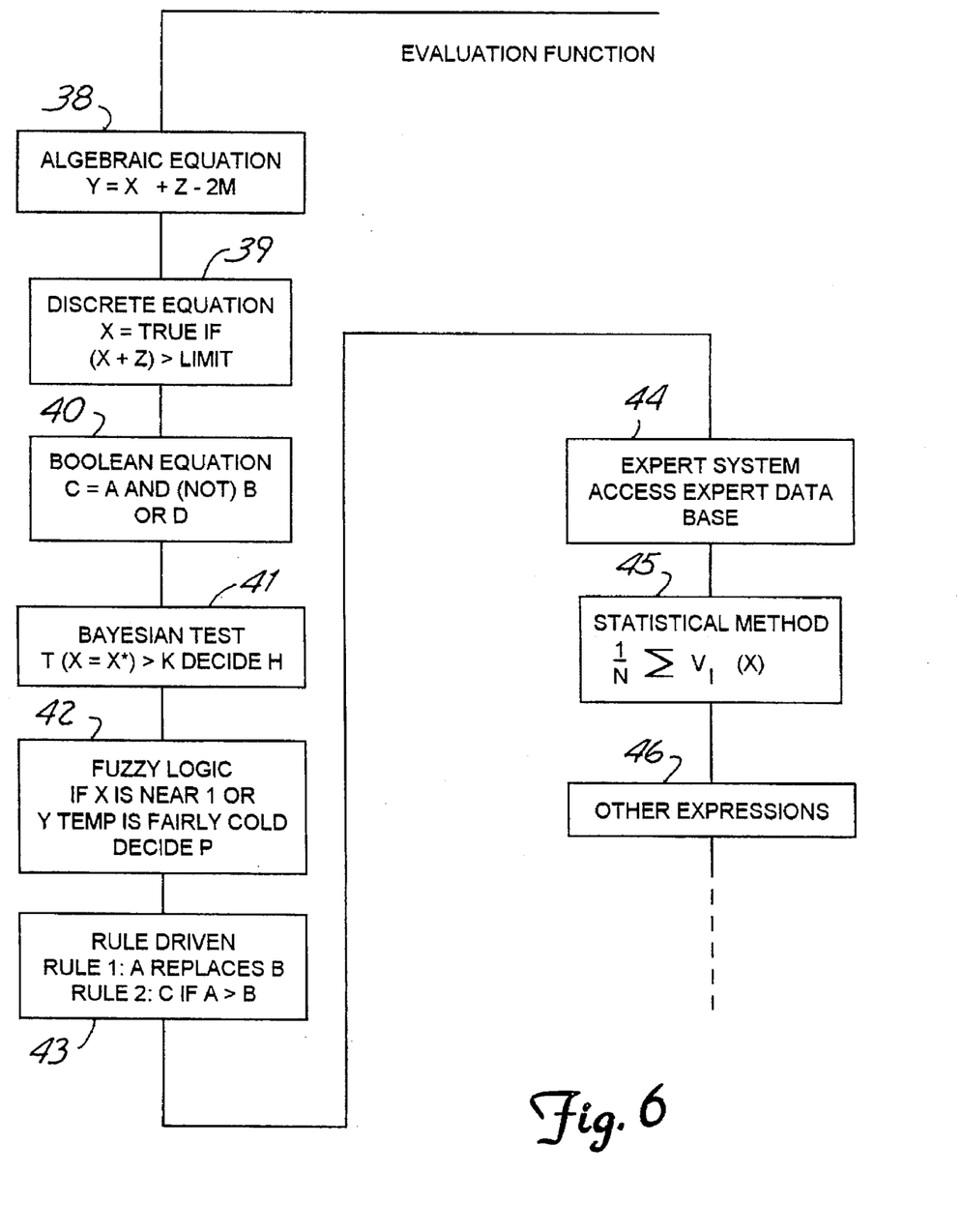
FIG. 6 shows details of intermediate and final results computations.

Final and intermediate computations are performed according to predetermined expressions. Examples of these expressions are shown in FIG. 6. The expressions shown in FIG. 6 merely illustrate the method. Many different types of expressions can be used for vehicle systems diagnostics. An evaluation function contained in a dot can access any of the expression types shown in FIG. 6. The expression types include normal algebraic equations 38, discrete equations that use algebraic methods to produce logical outcomes 39, Boolean equations 40, Bayesian tests 41, fuzzy logic 42, rule driven methods 43, expert systems 44, statistical methods 45 and other possible expressions 46.

Algebraic equations 38 are well known and are used to combine data and produce intermediate and final results. For example, see Schroeder et al., U.S. Pat. No. 5,132,909 (page 3,4). An example of such an algebraic equation is the summation of cylinder kilovolt values to produce a mean.

$$\text{Mean} = \frac{1}{N} \sum_{n=1}^{N} Kv_n$$

Discrete equations 39 are usually used to produce true/false or pass/fail logical values from numeric data. An example of such an equation is a comparison of kilovolt data against a fixed limit.

$$X \text{ (PASS) IF ( } (Kv > Limit_1) \text{ AND } (Kv < Limit_2) )$$

Discrete equations can contain any number of algebraic equations coupled to discretizing steps that can be, but are not limited to comparisons.

Boolean equations are commonly used to combine logical variables according to known logical rules to produce logical outcomes. An example of a Boolean equation is:

IF CRANKING VOLTS = LOW AND STARTER CURRENT =

HIGH AND RECOVERY VOLTAGE = GOOD

THEN BATTERY CABLES = BAD where GOOD would be assigned the logical value 1, and BAD would be assigned the logical value 0. (CRANKING VOLTS), (STARTER CURRENT), and (RECOVERY VOLTAGE) are Boolean variables capable of taking values of 0 and 1. Examples of other such situations can be found in Marshall et at., U.S. Pat. No. 4,373,186. General principles of Boolean algebra can be found in B. Holdsworth, *Digital Logic Design*, 2nd Ed., Butterworths, 1988, chap. 1.

Bayesian tests 41 are used to decide between two hypotheses based on conditional probabilities. For example, if the sample space of all possible cranking currents in a given cranking test is partitioned into two parts based on a cost function, and a given sample from an actual test is used to form a likelihood ratio of conditional probabilities of belonging to each of the two partitions given the sample value, the likelihood function can be compared against a fixed threshold to make the smallest average risk decision of which part the sample belongs in. This then leads to the choice of one hypothesis over a second hypothesis such as a decision that the battery is good as opposed to a decision that it is bad. Bayesian and related tests are not limited to only two hypotheses, but can be made multi-dimensional. For example, see: Hancock and Wintz, *Signal Detection Theory*, McGraw Hill, 1966 (chap. 3).

Fuzzy logic 42 uses variables that do not have certain values, but rather belong to sets. A fuzzy rule could be: If temperature is cold and cranking amps are low, battery may be good, but if temperature is warm and cranking amps are low, battery may be bad. Fuzzy logic is well known in the art and is used to make decisions based on data that takes ranges of values rather than single values. For example see Sakai et al., U.S. Pat. No. 5,079,704, and Levine, Drang, Edelson, *Artificial Intelligence and Expert Systems*, McGraw Hill, 1990, chapters 5, 6, and 7.

Rule driven techniques 43 resemble fuzzy logic (both contain rules); however, the rules require variables to take on strict logical values. An example of such a rule might be: if temperature is>15 degrees C. and cranking amps are less than 10, then battery is good.

Expert systems take model data, and try to use it to access a data base that was formed empirically from the knowledge of human experts. Sometimes this procedure is interactive, sometimes it is not. If the function evaluation of a final results dot involves an iterative expert system, it can be evaluated recursively as the expert system requests more and more data. An example might be that a cranking test yielded low amps and battery data. The expert system might request the operator for more information such as whether the battery contacts were clean or what the air temperature was. Here the final result dot would iterate between steps 65 and 63 as shown in FIG. 5. Expert systems are further described in Levine, Drang, Edelson, supra.

Statistical methods take sets of data and reduce them according to well known statistical techniques to yield results within certain confidence levels. For example, the average kilovolts of a certain cylinder can be compared statistically to the average kilovolts over all cylinders to yield a decision whether that cylinder is good or not. If the two averages differ by more than a fixed threshold, the cylinder can be said to be bad with a confidence level that is some number less than one. It could be known by statistically computing probabilities over a large ensemble of kilovolt values for that type of vehicle, that if the averages differ by 2000 volts, the cylinder has a problem with a confidence level of 0.98. This is simply an example for illustration; many other values are possible for different engines or vehicle. Statistical methods can be used (as can any of the other methods described) to analyze any vehicle system, not just ignition systems.

Probabilistic methods develop probabilities for various alternatives and then attempt to find a path or solution that maximizes the probability of a correct result. These methods are used when test results, symptoms, or other inputs yield enough information in themselves to develop sets of probabilities. They may also be used when various a priori probabilities are known based on vehicle attributes or symptoms.

It is to be understood that the above-described arrangements and expressions are merely illustrative of the application of the principles of the present invention, and that other arrangements may be devised by those skilled in the art without departing from the spirit and scope of the present invention.

We claim:

1. A vehicle fault diagnosis system comprising:

a diagnostics control module capable of issuing diagnostic commands;

a vehicle system testing module, coupled to the diagnostic control module and configured to initiate diagnostic tests upon the vehicle in response to test commands received by the vehicle system testing module, the vehicle system testing module producing vehicle test results and test completion status indicators;

at least one data source, the data sources together capable of providing vehicle attributes and symptoms: and an evaluation module, coupled to the diagnostic control module, the vehicle system testing module and each data source, the evaluation module capable of requesting a first set of information from each data source and the vehicle system testing module in response to a diagnostic command, the evaluation module requesting all necessary information that is particular to determining at least an initial root fault before evaluating any information to determine at least an initial root fault, wherein a root fault is the smallest faulty component or process identifiable by the evaluation module.

2. The vehicle fault diagnosis system of claim 1 wherein after determining an initial root fault, the evaluation module requests a second set of information, the evaluation module requesting all information in the second set of information before evaluating the information to determine a second root fault.

3. The vehicle fault diagnosis system of claim 2 wherein the evaluation module repeatedly requests sets of information before determining respective root faults until the root faults converge to a stable root fault.

4. The vehicle fault diagnosis system of claim 3 wherein a root fault determined by the evaluation module is recursively used in at least one other root fault determination by the evaluation module.

5. The vehicle fault diagnosis system of claim 1 wherein the evaluation module determines the root fault in part based on the vehicle system testing module indicating that one or more tests could not be executed by way of test completion status indicators.

6. The vehicle fault diagnosis system of claim 1 wherein the evaluation module uses dots to determine a root fault and wherein a dot is an object oriented structure, the evaluation module capable of using a single dot for two separate evaluations to make a single determination of a root fault.

7. A method of diagnosing vehicle faults using a system with final results dots and related measurement dots, the final results dots evaluating at least one expression to produce a root fault, said method comprising:

locating final results dots;

locating measurement dots related to the final results dot after locating the final results dots, said measurement dots commanding vehicle system measurements;

performing commanded vehicle system measurements producing measurement results and completion status indicators;

returning said measurement results and completion status indicators from the commanded measurements to said final results dots;

producing diagnostic results from said final results dots using the measurement results and the completion status indicators in predetermined expressions in the final results dots.

8. The method claimed in claim 7 further allowing measurement results and diagnostic results to take a value of "unknown".

9. The method claimed in claim 7 wherein the vehicle system is an internal combustion engine.

10. A vehicle diagnosis system, having an object oriented diagnosis structure based on dots, wherein a dot is a functional data array that performs a function based on inputs either independently or by initiating the execution of other dots, the vehicle diagnosis system coupled to various systems of the vehicle, the vehicle diagnosis system comprising:

a diagnosis command circuit, selecting a root dot based on values from the various systems of the vehicle;

an evaluation circuit, expanding the root dot by locating all other dots the root dot uses to perform its function, including all dots used indirectly by the root dot through one or more levels of intermediate dots, the expansion ending at one or more end dots that do not use other dots to perform their function, the evaluation circuit executing the end dots before all other dots and passing the results of the end dots to the dots that use the respective end dots following the inverse of the expansion, the evaluation circuit executing the root dot last to produce a root fault.

11. The vehicle diagnosis system of claim 10 wherein at least some of the end dots are test dots which initiate a test of the vehicle and which return test results and a test completion flag, the test completion flag indicating whether the test was successfully completed.

12. The vehicle diagnosis system of claim 11 wherein a root dot, which directly or indirectly causes a test dot to execute, is capable of using a test completion flag indication that a test was not successfully completed to determine a root fault.

13. The vehicle diagnosis system of claim 10 wherein at least one root dot includes a recursive execution of itself to obtain a plurality of successive root faults, each successive root fault based at least in part, on the preceding root faults.

14. The vehicle diagnosis system of claim 10 wherein a root dot can execute the same common dot through two different intermediate dots, where the two intermediate dots execute the common dot directly and the root dot executes the intermediate dots.

* * * * *

UNITED STATES PATENT AND TRADEMARK OFFICE
CERTIFICATE OF CORRECTION

PATENT NO. : 5,631,831
DATED : MAY 20, 1997
INVENTOR(S) : JOHN A. BIRD, MARTIN P. FRANZ, HARRY M. GILBERT, STEVEN F. JOHNSON, MICHAEL R. SHAFER

It is certified that error appears in the above-indentified patent and that said Letters Patent is hereby corrected as shown below:

Col. 6, line 7, delete "module 3", insert --module 18--

Col. 6, line 7, delete "commands 1", insert --commands 3--

Signed and Sealed this

Eighteenth Day of November 1997

Attest:

BRUCE LEHMAN

Attesting Officer

Commissioner of Patents and Trademarks